Nov. 11, 1924. 1,514,795
B. F. SEYMOUR
FLEXIBLE TRANSMISSION
Filed June 7, 1919
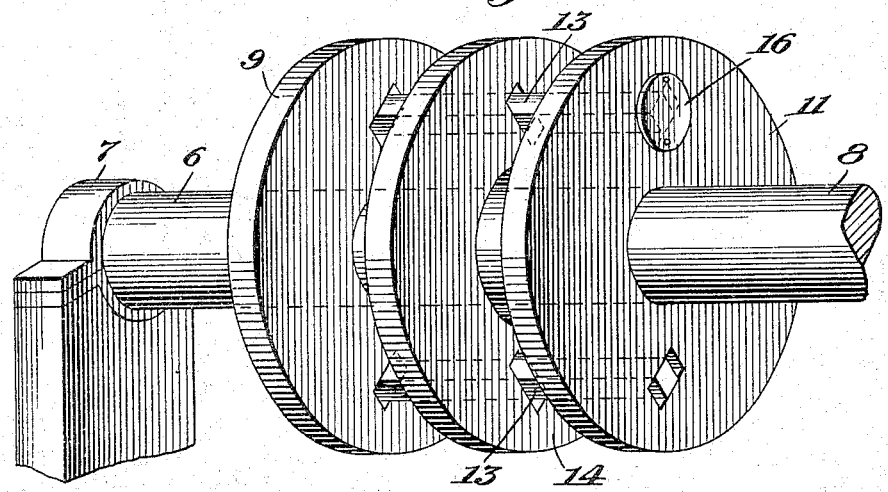
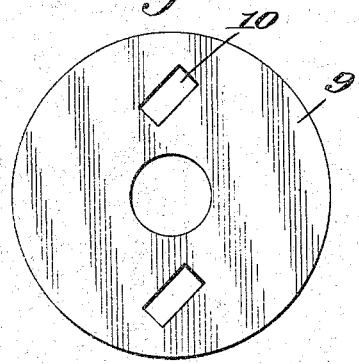
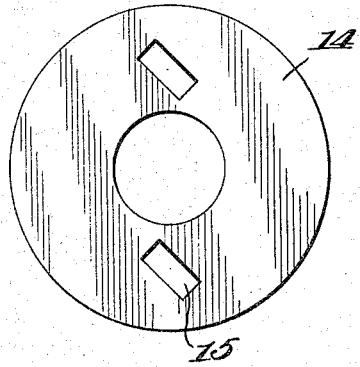
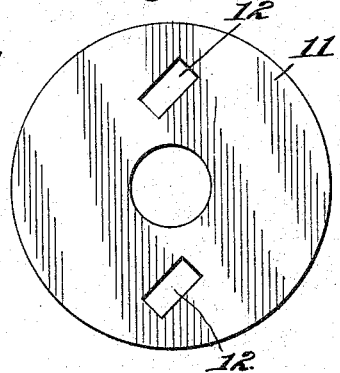
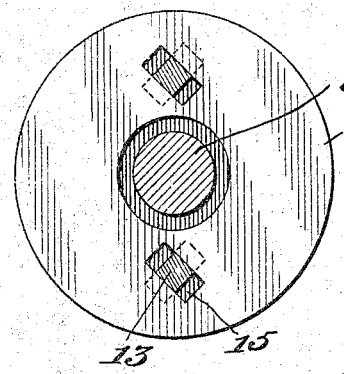
Inventor:
B. F. Seymour,
by H. H. Byrne
Att'y.

Patented Nov. 11, 1924.

1,514,795

UNITED STATES PATENT OFFICE.

BENJAMIN F. SEYMOUR, OF WASHINGTON, DISTRICT OF COLUMBIA.

FLEXIBLE TRANSMISSION.

Application filed June 7, 1919. Serial No. 302,410.

*To all whom it may concern:*

Be it known that I, BENJAMIN F. SEYMOUR, a citizen of the United States, residing at Washington, in the District of Columbia, have invented certain new and useful Improvements in Flexible Transmissions; and I do hereby declare the following to be a full, clear, and exact description of the invention, such as will enable others skilled in the art to which it appertains to make and use the same.

The present invention relates to flexible transmission and consists in the combinations and arrangements of elements hereinafter described and particularly set forth in the accompanying claims.

The purpose of the invention is to provide a flexible transmission between a driving and a driven element adapted to positively transmit the driving force whether said elements are in or out of true alinement; and one which will readily accommodate itself under all normal working conditions to which said elements would be subjected.

A further purpose of the invention is to provide a transmission of this character which will positively operate in all positions within a single plane, and one wherein there are few parts employed which will operate quite freely and with little friction.

The invention is shown by way of illustration in the accompanying drawing wherein—

Figure 1 is a perspective view thereof,

Figure 2, an end elevational view of the driving member,

Figure 3, a similar view of the intermediate member,

Figure 4, a similar view of the driven element, and

Figure 5 is a transverse sectional view of the several parts assembled.

Referring to the construction in further detail and wherein like reference characters designate corresponding parts, the construction consists of a driving element, or shaft, 6 suitably journalled in the bearings 7 and connected to operate the driven shaft 8 through the medium of the flexible transmission, as shown.

The driving shaft 6 is provided with a disc, or head plate 9, having formed therein a pair of diametrically disposed slots 10 of rectangular design in cross section; and a similar head or disc 11 is carried by the driven shaft 8. Said member 11 is also provided with a pair of diametrically disposed slots 12 that are parallel to the slots 10 in the disc 9 to receive the two loosely fitting power transmitting members, or bars, 13, as shown in Figure 1.

The two power transmitting bars 13 are supported mainly by the disc member 14 that is located intermediate of the members 9 and 11 and said disc 14 has a pair of diametrically disposed slots 15 that receive the two bars 13 and permit said bars to have limited movement within said slots to compensate for any lateral shifting or displacement between the driving and driven shafts 6 and 8, as will be understood.

The members 9 and 11 each have plates 16 closing the outer ends of their respective slots to retain the members 13 in position; and the bore of the central disc 14 is of sufficient diameter to allow said disc to have lateral movement with respect to the central shaft.

By having the slots of the driving and driven elements at right-angles to the slots of the intermediate or transmitting element will enable the respective elements to have any appreciable range of relative lateral displacement within the given plane, and thus will allow the driven shaft 8 to be driven from the shaft 6 when laterally displaced therefrom, or vice versa. And with having so few working parts there will be appreciably little loss of power due to friction in the operation of the transmitting element.

It will be obvious of course that different forms of construction may be provided in lieu of that disclosed and described herein. And while I have shown and described certain apparatus for accomplishing the result initially stated it is to be understood that I am not limited to the precise details shown but may on the other hand adopt such modifications or changes within the scope of the claims to better suit the end in view.

Having thus described my invention, what I claim is:

1. In a flexible coupling and drive the combination of a driving shaft, a driven shaft, disks fixedly mounted on said shafts and provided with slots in respective relatively angular relation, a freely floating disk intermediate said shaft disks and having slots registering with the slots thereof, and pins loosely fitting said slotted disks and permitting of relative lateral movement of said shafts, substantially as set forth.

2. In a flexible coupling and drive the combination of a driving shaft, a driven shaft, disks fixedly mounted on the respective adjacent ends of said shafts, and provided respectively with diametrically opposed slots, a freely floating disk intermediate the shaft disks and having diametrically opposed slots registering with the slots thereof, and floating pins fitting through said registering slots and permitting of relative lateral movement between said shafts, substantially as set forth.

In testimony whereof I affix my signature.

BENJAMIN F. SEYMOUR.